United States Patent [19]

Holliday et al.

[11] 4,059,673

[45] Nov. 22, 1977

[54] PRODUCTION OF BAUXITE AND ALUMINIUM CHLORIDE OF LOW IRON CONTENT

[75] Inventors: Robin David Holliday, Daytona Beach, Fla.; David John Milne, Highfields, Australia

[73] Assignee: Comalco Limited, Melbourne, Australia

[21] Appl. No.: 567,007

[22] Filed: Apr. 10, 1975

[30] Foreign Application Priority Data

Apr. 17, 1974  Australia .................................. 7271

[51] Int. Cl.$^2$ ........................ C01F 7/56; C01G 49/10
[52] U.S. Cl. .................................. 423/136; 423/135; 423/148; 423/149
[58] Field of Search ........... 423/133, 137, 149, 561 R, 423/135, 136, 148

[56] References Cited

U.S. PATENT DOCUMENTS

| | | | |
|---|---|---|---|
| 1,760,962 | 6/1930 | Phillips et al. | 423/133 |
| 1,771,481 | 7/1930 | Benner et al. | 423/570 |
| 1,785,464 | 12/1930 | Suzuki | 423/133 |
| 2,238,103 | 4/1951 | Fink et al. | 423/133 |
| 3,560,153 | 2/1971 | Hiester | 423/561 R |
| 3,690,828 | 9/1972 | Baitz et al. | 423/133 |
| 3,856,508 | 12/1974 | Othmer | 423/137 |
| 3,888,970 | 6/1975 | Haas et al. | 423/570 |
| 3,959,439 | 5/1976 | Pope | 423/137 |
| Re. 19,531 | 4/1935 | Benner et al. | 423/570 |

*Primary Examiner*—Herbert T. Carter
*Attorney, Agent, or Firm*—Larson, Taylor and Hinds

[57] ABSTRACT

Removal of iron from aluminous material such as bauxite is effected by treatment with a gas mixture comprising sulphur dioxide and carbon monoxide in a first step, followed by chlorination in a second step whereby ferric chloride is produced and removed by volatilization. Aluminium chloride of low iron content may be obtained from the purified aluminous material by chlorination.

8 Claims, No Drawings

PRODUCTION OF BAUXITE AND ALUMINIUM CHLORIDE OF LOW IRON CONTENT

This invention principally relates to a new process for the manufacture of aluminium chloride from bauxite, and other aluminous materials, such as laterites and clays. Although the following detailed description will for convenience refer only to bauxite, it will be understood that the processes are also applicable to the said other aluminous materials.

The first stage of this process involves the production of bauxite of low iron content which material is also suitable for the manufacture of aluminous refractory materials and, if desired, may be so used. Consequently the said first stage may be employed independently to produce bauxite of low iron content.

Many previous attempts at the preparation of aluminium chloride ($AlCl_3$) of low iron content have been described in the patent literature. However, the methods described suffer from one or more of the following defects:

a. removal of iron is relatively poor, and the material produced is of limited use in the manufacture of aluminium b. high losses of alumina ($Al_2O_3$) occur in the purification stages, so that ultimate yields are poor c. the bauxite has to be treated by the Bayer process to produce alumina low in iron prior to chlorination d. excessively high temperatures, of the order of 900° C to 1100° C, are needed to achieve economically acceptable reaction rates in the chlorination stage unless a catalyst is employed, which usually requires excessive reactor volume and entails additional capital and operating costs e. the high temperature required in the final chlorination stage (d) also lead to severe corrosion problems in the refractories of the reactors.

One of the main benefits of the process of the present invention is that it may be integrated to form a sequence of steps or stages in which purification of bauxite and finally production of aluminium chloride are attained at optimally low temperatures without the sacrifices in reaction rates known to occur in existing processes, without the prior preparation of Bayer alumina and without the use of catalysts.

Alternatively, the stages leading to the production of low iron bauxite may be employed not only as preliminary to producing aluminium chloride but also as a means for obtaining low iron aluminous material which has been found to be ideally suited to the manufacture of high quality refractories.

In both processes, minimization of the loss of alumina during the high temperature reactions is essential if overall yields are to be kept high. By the use of relatively low temperatures during the purification, losses of alumina may be held to a very low level in the present process.

The process of the present invention depends in the first place on utilizing the unexpectedly desirable properties of certain mixtures of sulphur dioxide ($SO_2$) and carbon monoxide (CO) gases within a certain temperature range to attain very high rates of conversion of iron oxide to iron sulphide. Control of the composition of the gas mixture is important to:

a. attain maximum reaction rates b. avoid excessive consumption of sulphur in the formation of iron sulphide c. enable the sulphidization temperature to be kept as low as possible so that high reactivity of $Al_2O_3$ is maintained in the final chlorination stages.

As a result of the systematic investigation of the effects of gas composition and temperature on the rate of conversion of iron oxide to iron sulphide, it has been established that a gas composition in the range of 20–40% $SO_2$ by volume with the balance being CO apart from minor diluents, leads to high reaction rates over the entire temperature range likely to be used for commercial application of the process. The preferred gas composition for maximum reaction rates (at temperatures of 400°–750° C) is in the vicinity of 30% $SO_2$ : 70% CO by vol. The commercial temperature range extends from 450° C, below which the reaction rate is too low to be economic, up to 750° C, above which there occurs a reduction in the surface area of the alumina and a consequent loss of reactivity. Owing to the high reaction rates over the temperature range mentioned there is no need for any adjustment of gas composition to compensate for the lower temperatures which may exist at the initial sulphidization stage.

A further feature of the process is the use of low temperatures in a preliminary dehydration stage, in which entrained and combined water is removed from the raw material. Satisfactory rates of dehydration are attained at temperatures below 750° C and it is again detrimental to exceed this temperature because of the adverse effects on reaction rates in the subsequent stages of the process.

It has been found unexpectedly that conducting the sulphidization in accordance with the present invention yields a product in which iron can be very readily converted to iron chloride ($FeCl_3$) by heating in the presence of chlorine ($Cl_2$) gas, and removed by volatilization at temperatures as low as 430°. For example, under such conditions for bauxites containing ca. 13% $Fe_2O_3$, losses of alumina are less than about 1% at 80% iron removal. Complete removal of iron at 650° to 750° leads to an overall loss of ca. 2 to 3% of the $Al_2O_3$.

Purification of bauxite under the above conditions produces a material with an iron content of about 0.1% in a total reaction time of 20 mins. or less. Rates of purification in a full scale fluidized bed reactor can be expected to be very high, viz., of the order of 200–500 lb/sq ft. per hour.

The purified and dehydrated bauxite may finally be chlorinated in a third and separate reaction stage to produce practically pure aluminium chloride with an iron content of the order of 0.05% Fe. Reaction is most rapid when an equi molar mixture of CO and $Cl_2$ is employed, and the rate depends on the temperature used in the prior treatments. For example complete reaction of the alumina content of bauxite particles of ca. 3/16 in. diameter is attained at residence times of 60 mins. at 650°–750°. Use of higher temperatures than these leads to a loss of reactivity, while at lower temperatures rates decrease markedly in accordance with chemical rate laws. In a fluidised bed reactor with particulate material not exceeding 3/16 inch diameter, production rates of $AlCl_3$ of 100–200 lb/sq per hour may be attained under optimum conditions.

One specific method for carrying out the purification using fluidised beds may consist of the following series of steps.

In the first step raw bauxite, possibly after a preliminary wet screening, is crushed to a maximum particle size of the order of 2mm diameter. Removal of at least 95% of the total water content is then carried out during a dehydration treatment at a maximum temperature of 750° C in a fluidised bed. The fluidising gas may be a nonreactive mixture of air and flue gases obtained by controlled combustion of a suitable fuel, such as coal, coke, natural gas or oil. The temperature of the bed is controlled by the temperature of the fluidising gas, which provides all the heat required for removal of both entrained and combined water.

In the second stage, the preheated material from the dehydration step is sulphidized using a gas composition in the range 20 to 40% $SO_2$ by vol. with the balance being CO and minor diluents. Dilution of the gas by inert components is permissible but the reaction rate is reduced. The heat supply of the input gas is controlled so that the bed temperature does not exceed 750°. As stated, the composition of the gas has a great influence on the reaction rate, and it is preferable that it be controlled closely within the optimum during the reaction. A residence time of ca. 20 min is required to attain substantially complete conversion of iron oxide to iron sulphide.

In the third step, the sulphidized iron is preferably removed as volatile $FeCl_3$ by treatment with $Cl_2$ gas. The reaction proceeds reasonably rapidly at temperatures as low as 430° in the absence of a catalyst, but the rate increases with temperature up to the permissible maximum of 750°. For example, at 700° reduction in the iron oxide content from an initial 6.5% to a final 0.15% takes place in 20 minutes and during such treatment, $Al_2O_3$ losses of the order of 2% are experienced.

In an alternative method of operation, which is preferred when the iron oxide content is of the order of 7% or more, loss of alumina may be lessened by conducting the chlorination of iron in two stages: In the first, ca 80% of the iron is removed by treatment with $Cl_2$ gas for 20 min at 430°, chlorination is then continued at a temperature of 700°-750° which results in an aluminium chloride product after the fourth step (see below), in which the iron level is of the order of 0.05% total iron with a total loss of alumina of ca. 2%.

The product from the beneficiation stage, which still contains the silica, titanium oxide, and other minor constituents of original bauxite, is suitable for processing to refractory grade aluminous material by suitable known technology.

In the fourth step aluminium chloride is produced by reacting the hot particulate material from the third step in a final fluidised bed operation, using an essentially equi-molar mixture of gaseous CO and $Cl_2$, which serves both as reactant and as fluidising medium. To secure maximum chlorination rates, the preferred temperature range is 650°-750°, at which temperatures damage to refractories can be kept to a minimum, and it is important that the gas composition be kept close to the preferred 50:50 $CO:Cl_2$ volume ratio. However, lower rates which may be acceptable in certain economic circumstances may be obtained at temperatures down to 550° C. Also solid carbon may replace CO provided the temperature conditions specified are not substantially altered. No catalyst addition is required. Again, as in the earlier stages, it is important that the reaction temperature does not exceed 750°, since a marked fall-off in reaction rate is observed at the higher temperatures.

Residence time or complete reaction of particulate material up to 3/16 in. diameter may be less than 60 min, and a reduction in particle size further lessens the time required.

The silica and titanium oxide constituents of the beneficiated material will also be converted into volatile chlorides and can be separated from the aluminium chloride by known technology. The specified sequence of reaction steps achieves the following advantages:

1. unexpectedly high rates of chlorination of the alumina content of bauxites are achieved at 650°-750° in the absence of a catalyst, which are comparable to those attained with alpha-alumina at 1100°.
2. the use of maximum fluidised bed temperatures of 750° means that the reactor equipment is operating under conditions of very low chlorination rate of high-alumina, silica and similar commercial refractories.
3. the sequence of dehydration, purification and chlorination steps proposed allows high thermal efficiency to be attained with the heat requirements of the process being met most economically.
4. in the beneficiation stages, very much lower levels of iron contamination are obtained under relatively less rigorous reaction conditions than in conventional practice.
5. the entire sequence of operations is carried out at temperatures not exceeding 750° C which is substantially lower than in competitive systems in which bauxite is the starting material.

Preferred embodiments of the invention are illustrated by the following examples:

EXAMPLE I

Weipa bauxite of the approximate composition 58% $Al_2O_3$, 7% $Fe_2O_3$, 2.5% $TiO_2$, 5% $SiO_2$ and 27.5% $H_2O$ was ground to 100–200 microns diameter and calcined at 720° C. The combined water from the iron and alumina hydrates was removed and left a high surface area bauxite. 30g of the calcined bauxite was heated to 720° C in a 5cm diameter fluid bed reactor vessel within an electric furnace and reacted with a gaseous mixture of sulphur dioxide and carbon monoxide. For the purpose of this experiment the gases were in the ratio 35% $SO_2$ 65% CO and were introduced at the combined rate of about 1 Kg/hr to achieve smooth fluidisation of the bauxite.

The iron in the bauxite reacted to form iron sulphide in a short period of time. The $SO_2$/CO mixture was flushed away with a stream of nitrogen and the sulphided bauxite was heated to 750° C. Chlorine gas was introduced at the rate of 1Kg/hr. which resulted in very rapid removal of the iron from the bauxite as iron (III) chloride which was subsequently recovered from an external condenser. Volatile sulphur chloride was also formed at the same time and condensed externally.

The residual iron remaining in the bauxite was about 0.2% equivalent to about 97% removal of the iron. Most of the other bauxite components remained in the bed, the loss of aluminium oxide as volatile aluminium chloride being about 2%.

EXAMPLE II

A 2.5g sample of Weipa bauxite in the form of 3.1 mm to 4.7 mm diameter pisolites was placed in a continuously recording thermobalance which enabled the monitoring of reaction rates of the solid with various gases. The composition of the bauxite was approximately 58% $Al_2O_3$, 7% $Fe_2O_3$, 2.5% $TiO_2$, 5% $SiO_2$ and 27.5% $H_2O$. The temperature of the thermobalance was raised to 720° C and the sample weight decreased corresponding to the loss of combined water. The calcined bauxite was treated at 720° C with a gaseous mixture of 35% sulphur dioxide and 65% carbon monoxide at 1000cc/min. A very rapid weight gain was observed which corresponded to the iron oxide being converted to iron sulphide. After no further weight change was observed the $SO_2$/CO mixture was swept from the reaction vessel by a stream of nitrogen and the temperature was raised to 740° C. The nitrogen was replaced by a stream of chlorine gas at 800cc/min which resulted in an extremely rapid weight loss, the iron being removed as volatile iron (III) chloride. The weight loss was slightly greater than the stoichiometric for iron removal and included a small loss of alumina as volatile aluminium chloride. The residual iron in the beneficiated bauxite was determined to be 0.1%, equivalent to 98.5% removal of the iron. The loss of alumina amounted to 2-3%.

We claim:

1. Process for production of aluminum chloride of low iron content from aluminous materials containing iron, which comprises in a first step reacting an aluminous material containing iron at temperatures from 400° to 750° C with a gas mixture comprising 20 to 40% $SO_2$ by volume, the balance being CO apart from minor diluents, to produce iron sulphide; in a second step, heating the product of the first step in the presence of chlorine, whereby ferric chloride is produced and removed by volatilization, whereby a purified aluminous material of low iron content is obtained; and in a third step, chlorinating said purified aluminous material with a chlorinating gas to produce aluminum chloride of low iron content.

2. Process according to claim 1 in which the chlorinating gas contains chlorine and carbon monoxide.

3. Process according to claim 1 in which the chlorination in the second step is effected at 650°-750° C.

4. Process according to claim 1 in which the aluminous material is bauxite.

5. Process according to claim 1 including a preliminary dehydration stage in which entrained and combined water is removed from the raw material by heating at temperatures up to 750° C.

6. Process for removing iron from bauxite which comprises
   a. heating the bauxite raw material at temperatures not exceeding 750° C to remove entrained and combined water;
   b. treating the product of step (a) at temperatures from 400° to 750° C with a gas mixture consisting essentially of 20 to 40% $SO_2$ and 80 to 60% CO by volume to sulphidize iron contained therein;
   c. treating the product of step (b) at temperatures between 430° and 750° C with chlorine and removing the iron chloride so produced by volatilization.

7. Process according to claim 6 wherein the purified bauxite resulting from step (c) is chlorinated with a chlorinating gas consisting essentially of chlorine and carbon monoxide.

8. Process according to claim 7 in which said chlorinating step is carried out at temperatures from 650 to 750° C and the chlorinating gas is an approximately equimolar mixture of chlorine and carbon monoxide.

* * * * *